United States Patent
Ponter et al.

(10) Patent No.: US 9,964,020 B2
(45) Date of Patent: May 8, 2018

(54) BLEED VALVE ASSEMBLY

(71) Applicant: Ford Global Technologies, LLC, Dearborn, MI (US)

(72) Inventors: Christopher Ponter, Romford (GB); Daniel Moll, Purfleet (GB); Les William Routledge, Hockley (GB)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 15/143,285

(22) Filed: Apr. 29, 2016

(65) Prior Publication Data

US 2016/0341103 A1    Nov. 24, 2016

(30) Foreign Application Priority Data

May 22, 2015   (GB) .................................. 1508778.6

(51) Int. Cl.
*F01P 11/02*       (2006.01)
*F16K 5/04*        (2006.01)

(52) U.S. Cl.
CPC ......... *F01P 11/028* (2013.01); *F01P 11/0285* (2013.01); *F16K 5/0407* (2013.01); *F16K 5/0478* (2013.01)

(58) Field of Classification Search
CPC .............. F04B 53/22; F04B 2027/1859; F16K 5/0407; F16K 5/0605; F16K 5/0684; F16K 5/0689; F16K 5/204
See application file for complete search history.

(56) References Cited

U.S. PATENT DOCUMENTS 3,142,358 A * 7/1964 Woerheide, Jr. ....... F01M 9/108
                                                  184/6.17
3,790,077 A * 2/1974 Wisyanski ............. F02M 31/06
                                                  137/859

(Continued)

FOREIGN PATENT DOCUMENTS

CN        202707751 U       1/2013
CN        203335798 U      12/2013

(Continued)

OTHER PUBLICATIONS

"Dorman—OE Solutions Coolant Air Bleeder Screw," Advance Auto Parts, http://shop.advanceautoparts.com/p/dorman-oe-solutions-coolant-air-bleeder-screw-902-112/10014334-P, pp. 1-3, Accessed Jun. 1, 2015.

(Continued)

*Primary Examiner* — Long T Tran
(74) *Attorney, Agent, or Firm* — Greg Brown; McCoy Russell LLP

(57) ABSTRACT

Methods and systems are provided for a bleed valve assembly for an engine. In one example, a method (or system) may include a fastener comprising a threaded shank received within a bore of the engine, a bleed bore within the fastener, and a bleed plug including a threaded portion received within the bleed bore of the fastener. The bleed plug may include an internal passage extending from one end of the bleed plug and a side port in fluidic communication with the passage so that when the bleed plug is in an open position fluid from an engine fluid chamber may flow through the passage of the bleed plug and out of the port.

20 Claims, 4 Drawing Sheets

(56) References Cited

U.S. PATENT DOCUMENTS

| | | | |
|---|---|---|---|
| 3,948,481 A | 4/1976 | Pollock | |
| 5,579,815 A | 12/1996 | Labonté | |
| 7,036,525 B2 * | 5/2006 | Ichinose | F16K 31/0634 |
| | | | 137/596.17 |
| 7,779,818 B2 * | 8/2010 | Wilson | F02M 37/20 |
| | | | 123/514 |
| 9,091,326 B2 * | 7/2015 | Tawarada | F16H 7/0848 |
| 2012/0252616 A1 * | 10/2012 | Tawarada | F16H 7/0848 |
| | | | 474/110 |

FOREIGN PATENT DOCUMENTS

| | | |
|---|---|---|
| DE | 4007277 A1 | 9/1991 |
| DE | 202013006740 U1 | 12/2014 |
| JP | 2010048142 A | 3/2010 |
| WO | 3420735 A1 | 9/1994 |

OTHER PUBLICATIONS

Combined Search and Examination Report of Great Britain Patent Application No. 1508778.6, dated Oct. 26, 2015, 8 pages, Intellectual Property Office.
Examination Report of Great Britain Patent Application No. 1508778.6, dated Mar. 3, 2016, 2 pages, Intellectual Property Office.

* cited by examiner

BLEED VALVE ASSEMBLY

CROSS-REFERENCE TO RELATED APPLICATION

This application claims priority to Great Britain Patent Application No. 1508778.6, filed May 22, 2015, entitled "A BLEED VALVE ASSEMBLY," the entire contents of which are hereby incorporated by reference for all purposes.

FIELD

The present disclosure relates to a bleed valve assembly for an engine and is particularly, although not exclusively, concerned with a bleed valve assembly capable of bleeding coolant across a sealed cavity of the engine.

BACKGROUND/SUMMARY

Packaging of components is a consideration for motor vehicle design. Assemblies are made as compact as possible while allowing for access to components for servicing and maintenance of the vehicle. Bleeding of engine coolant from an engine cylinder head to ensure no air is present within a cooling system is a common maintenance task. The cylinder head may be designed to incorporate a suitable bleed point from which coolant can be bled (e.g., released) effectively.

A boss may be provided on the cylinder head with a bore which affords direct access to a coolant chamber of the engine. A bleed plug can be installed into the boss to control the bleeding of coolant. However, the inventors herein have recognized potential issues with such systems. As one example, packaging requirements often do not allow the boss to be positioned optimally for providing access for service and maintenance. As packaging requirements become more restrictive, space required for a boss may not be available.

In one example, the issues described above may be addressed by a method for a bleed valve assembly for an engine, the assembly comprising: a fastener comprising: a threaded shank received within a bore of the engine, the bore in fluidic communication with a fluid chamber of the engine, a shoulder formed between the shank and a head of the fastener, the fastener providing a clamping force, and a bleed bore comprising an internal thread; and a bleed plug comprising a threaded portion received within the bleed bore of the fastener, the bleed plug comprising: an engaging portion at a proximal end of the bleed plug configured to selectively engage the fastener; a passage extending from a distal end of the bleed plug; and a side port in fluidic communication with the passage, the side port provided between the threaded portion and the engaging portion; wherein when the bleed plug is in an open position in which the engaging portion does not engage the fastener, fluid from the fluid chamber may be bled by the bleed plug with the fluid passing through the passage and side port and by-passing the threaded portion of the bleed plug; and wherein the bleed bore of the fastener comprises a chamfered edge at an opening of the bleed bore, wherein the engaging portion abuts the chamfered edge. In this way, the bleed valve assembly may bleed fluid through the bleed plug without reducing the clamping force provided by the fastener.

To avoid unnecessary duplication of effort and repetition of text in the specification, certain features are described in relation to one or more aspects or embodiments of the disclosure. However, it is to be understood that, where it is technically possible, features described in relation to any aspect or embodiment of the disclosure may also be used with any other aspect or embodiment of the disclosure within the scope of the claims below.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-4 are shown to scale, although other relative dimensions may be used.

DETAILED DESCRIPTION

The following description relates to systems and methods for a bleed valve assembly of an engine (e.g., an internal combustion engine).

Figure 1:
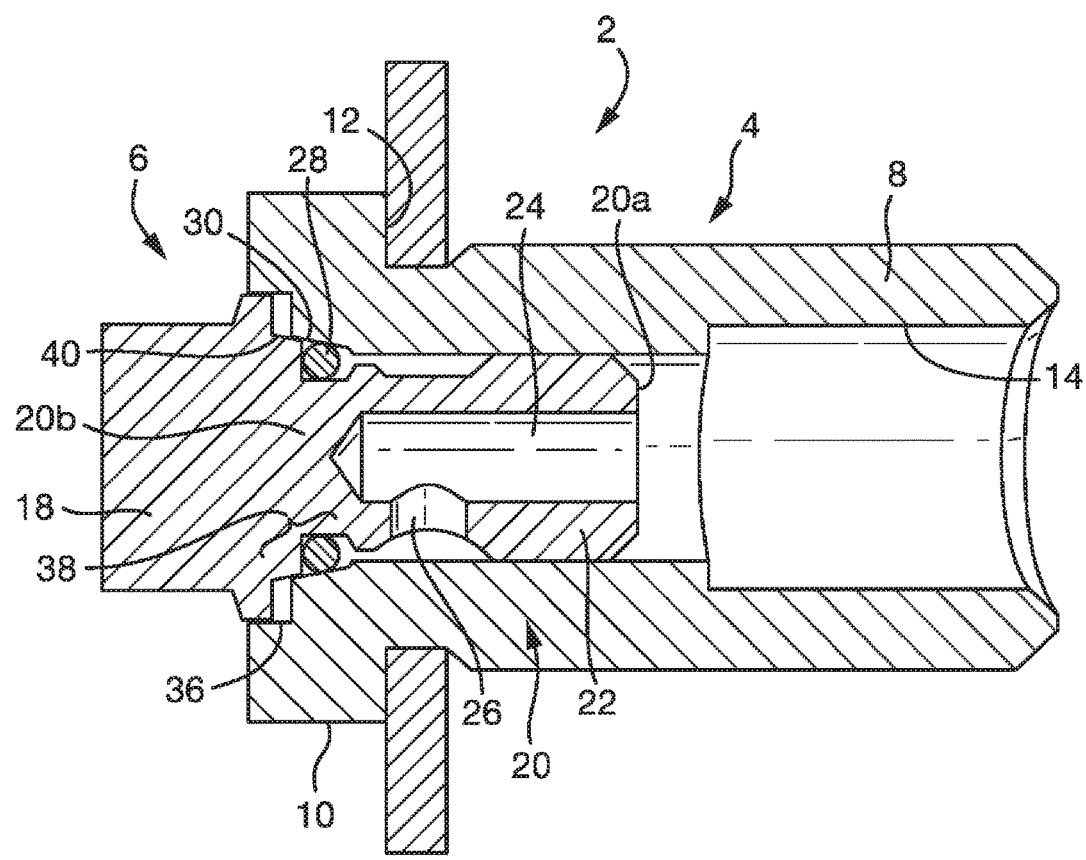
FIG. 1 is a sectional view of an embodiment of a bleed valve assembly showing the bleed valve assembly in a closed position.
Figure 2:
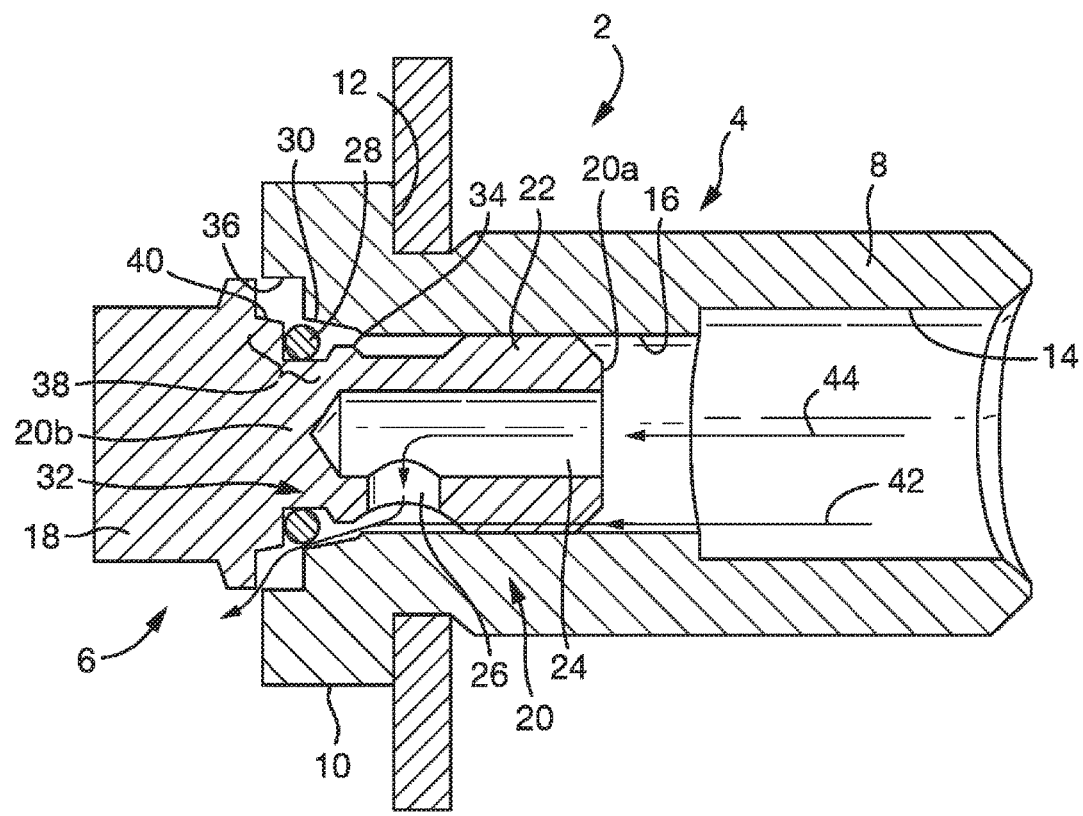
FIG. 2 is a sectional view of the bleed valve assembly showing the bleed valve assembly in an open position.

An engaging portion of a bleed plug may comprise an abutment surface selectively engaged with a fastener, as shown by FIG. 1. Additionally or alternatively, the engaging portion may comprise a seal (e.g. an o-ring seal) selectively engaged to the fastener to increase sealing between the bleed plug and the fastener. The bleed plug may further comprise a radial protrusion provided between the engaging portion of the bleed plug and a side port of the bleed plug. The radial protrusion may restrict a flow area for a fluid being bled by the bleed plug during initial opening of the bleed plug. The radial protrusion and/or a bleed bore may increase the flow area for the fluid being bled as the bleed plug is opened further, as shown by FIG. 2. The radial protrusion may retain the seal on the bleed plug.

A pitch of a thread provided on the bleed bore of the fastener may be different to a pitch of a thread on a shank of the fastener. The pitch of the thread provided on the bleed bore of the fastener may be smaller than the pitch of the thread on the shank of the fastener. A direction of the thread provided on the bleed bore (e.g., internal bore) of the fastener may be different from a direction of the thread on the shank of the fastener.

The bleed bore of the fastener may be concentric with the threaded shank of the fastener. Alternatively the bleed bore of the fastener may not be concentric with the threaded shank of the fastener, such that a portion of a torque applied to the bleed plug acts on the fastener in an opposite sense, thereby reducing a net torque applied to the fastener.

Figure 3:
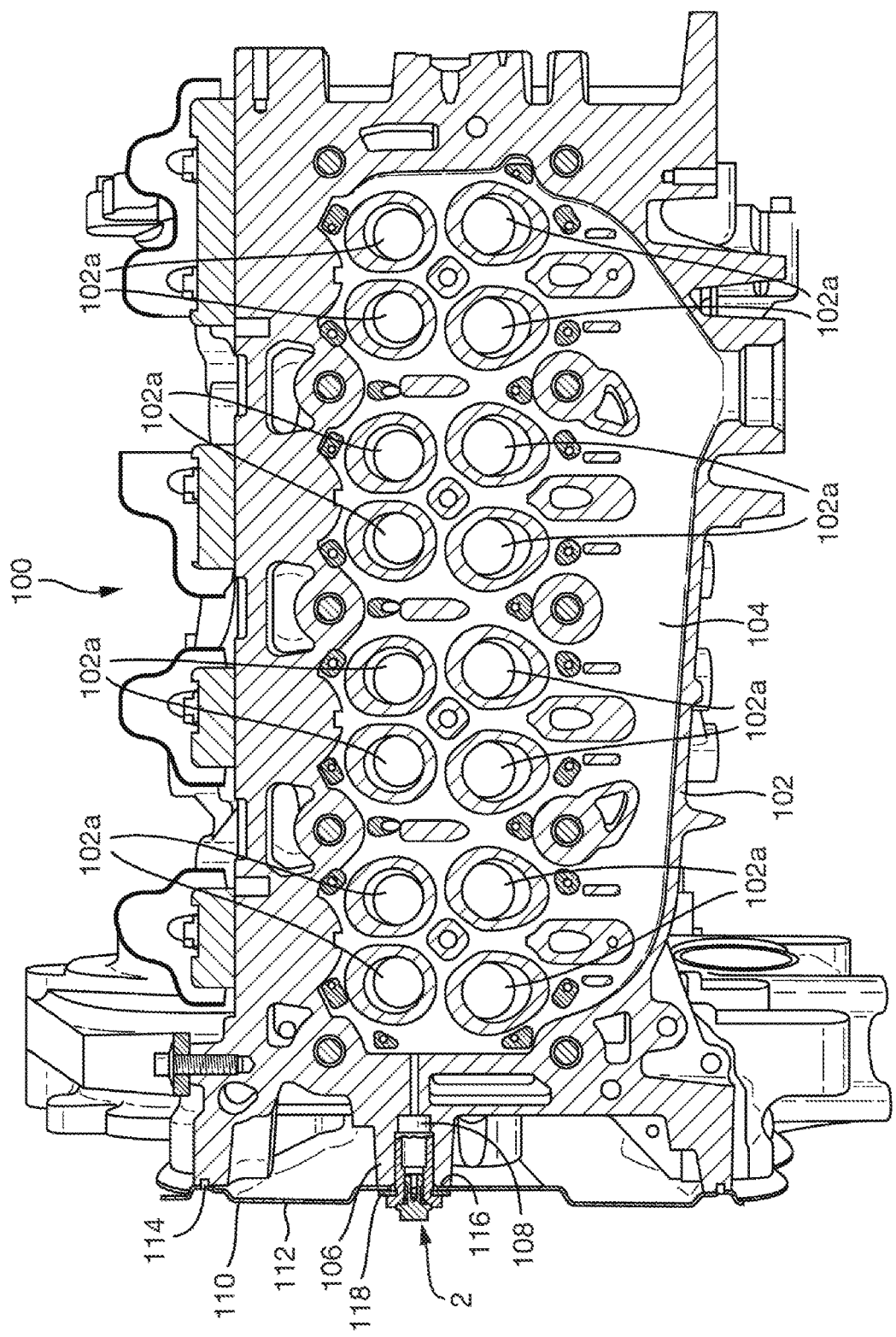
FIG. 3 is a sectional view of an engine assembly including the bleed valve assembly, showing the bleed valve assembly directly coupled to the engine assembly.

The fastener may be directly coupled to a cover of the engine, as shown by FIG. 3. An engine bore may be arranged such that the fastener increases a noise, vibration and/or harshness reducing characteristic of the cover when the fastener is received within the engine bore. For example, the engine bore may be positioned such that the fastener is provided at an anti-node in a mode of vibration of the cover.

According to another aspect of the present disclosure, there is provided an engine assembly for a motor vehicle, the engine assembly comprising: an engine cylinder head; a cover configured to seal an oil cavity of the engine; a bleed valve assembly as described above and below in the discussion of FIGS. 1-4; a boss provided on the engine cylinder head and extending across the oil cavity to the cover, the boss comprising the engine bore, wherein the engine bore is in fluidic communication with a coolant chamber of the engine; wherein the fastener is configured to be received within the bore of the boss and couple the cover to the boss; and wherein the bleed plug is adapted to allow fluid to be bled from the coolant chamber across the oil cavity of the engine, as shown by FIG. 4.

The assembly may thereby bleed coolant via the bleed plug without reducing a clamping force provided by the fastener.

An embodiment of a bleed valve assembly is shown by FIG. 1. The bleed valve assembly 2, according to an arrangement of the present disclosure, comprises a fastener 4 and a bleed plug 6. The fastener 4 comprises a head 10 and a shank 8. A thread is provided at least partially along the length of the shank 8. A shoulder 12 is formed between the head 10 and the shank 8, which provides a clamping surface that contacts a component though which the shank of the fastener has been passed, in order to apply a clamping force to the component.

The fastener 4 further comprises a bleed bore 14. The bleed bore may be provided such that it is substantially concentric with the shank 8 or it may be provided such that it is not concentric with the shank 8. The bleed bore 14 comprises an internal thread 16. The internal thread 16 may be provided partially or fully along the length of the bleed bore 14. The internal thread 16 may have substantially the same inner diameter as an unthreaded portion of the bleed bore 14 or may have a smaller or larger inner diameter.

The bleed plug 6 may comprise a head 18 and a shank 20. The shank 20 comprises a threaded portion 22. The threaded portion 22 may be provided at or towards a first end 20a of the shank 20. As shown in FIG. 1, the threaded portion 22 of the bleed plug may have a greater outer diameter than a remaining portion of the shank 20.

The threaded portion 22 of the bleed plug 6 and the internal thread 16 of the bleed bore 14 may be configured such that the bleed plug 6 may be threaded into the bleed bore 14 of the fastener 4.

The bleed plug 6 comprises an engaging portion 38 (e.g., a shoulder) at or near a second end 20b of the shank 20 adjacent to the head 18. When the bleed plug 6 is threaded into the bleed bore 14 of the fastener 4, the engaging portion 38 may engage the fastener 4, for example an abutment surface 40 of the engaging portion 38 may engage the bleed bore 14 at an opening 32 to the bleed bore 14. Contact between the engaging portion 38 and the fastener 4 may seal the bleed bore 14 around the bleed plug 6.

The engaging portion 38 may further comprise a seal, such as an o-ring seal 28. The o-ring seal may be configured such that when the shank 20 is received within the bleed bore 14 of the fastener, the o-ring seal is received, e.g. fully or partially, within the bleed bore 14. The o-ring seal may increase the seal between the bleed plug 6 and the bleed bore 14.

An edge 30 is provided at the opening 32 of the bleed bore 14. When the shank 20 is received within the bleed bore 14, the abutment surface 40 and/or the o-ring seal 28 abuts the edge 30. As depicted, the edge 30 is chamfered and the abutment surface 40 may be tapered with a slope corresponding to that of the chamfer.

The bleed plug 6 further comprises a passage 24, which extends axially from a distal end of the bleed plug 6, e.g. the first end 20a of the shank 20, towards the head 18 of the bleed plug 6. The passage 24 may be substantially central within the shank 20. A side port 26 is provided in fluidic communication with the passage 24. The side port 26 is provided on the shank 20 between, e.g. longitudinally between, the threaded portion 22 and the engaging portion 38. Alternate embodiments may include two or more side ports. The additional side ports may also be in fluidic communication with the passage of the bleed plug.

One or more radial protrusions 34 (e.g., ribs) may be provided on the shank 20. The one or more radial protrusions may comprise a single protrusion and may extend circumferentially, e.g. fully or partially, around the shank 20. Alternatively, the one or more radial protrusions 34 may comprise a plurality of radial protrusions spaced around the circumference of the shank 20, e.g., equiangularly. The radial protrusions 34 may be positioned between the side port 26 and the o-ring seal 28. The diameter of an outer surface of the radial protrusions may be greater than the diameter of the shank 20 and may restrict a flow area for any fluid flowing from the side port 26 to the o-ring seal 28 and/or the opening 32. The radial protrusions 34 may comprise proximal and distal side walls extending from the shank 20. As depicted, either or both of the side walls may be tapered, which may reduce disturbance to the fluid flow over the protrusions.

In an alternate embodiment (not shown) the diameter of the outer surface of the radial protrusions 34 may be substantially equal to the diameter of the bleed bore 14, e.g. the radial protrusion may substantially fill a radial gap between the shank 20 and the bleed bore 14. Additionally or alternatively, the radial protrusions 34 may be provided with openings which allow a restricted flow of fluid from the side port 26 to the o-ring seal 28 through the radial protrusions 34. As shown in FIG. 2, the o-ring seal 28 may be retained at the second end 20b of the shank 20 by the radial protrusions 34.

The fastener 4 may further comprise a counter bore 36. When the shank 20 of the bleed plug 6 is received within the bleed bore 14, the head 18 of the bleed plug 6 may be at least partially received within the counter bore 36.

In use, the fastener 4 may be assembled into a motor vehicle such that the bleed bore 14 is in fluidic communication with a fluid chamber containing a fluid which is to be bled by the bleed plug 6. For example, the fastener may be assembled into a boss provided on a cylinder head of an engine of a vehicle, as described with reference to FIGS. 3-4 below. In FIG. 1, the bleed valve assembly 2 is shown in a closed position with the shank 20 of the bleed plug 6 fully received within the bleed bore 14, such that the abutment surface 40 and the o-ring seal 28 abut the edge 30. In this arrangement the bleed bore 14 may be sealed by the bleed plug 6.

With reference to FIG. 2, the bleed valve assembly 2 may be adjusted to translate the bleed plug 6 into an open position. For example, the head 18 of the bleed plug 6 may comprise a screw drive, such as a hex head or pozidriv. The bleed plug 6 may be turned by virtue of the screw drive and the threaded portion 22 of the bleed plug may be unscrewed from the internal thread 16 of the bleed bore 14. As depicted in FIG. 2, the engaging portion 38 may no longer engage the fastener 4, e.g. the abutment surface 40 and/or the o-ring seal 28 may no longer abut the edge 30. Hence, the bleed bore 14 may no longer be sealed. When the bleed plug 6 is in the open position (e.g., when the bleed plug 6 is displaced from the threaded bore 14), fluid may flow through the passage 24 and the side port 26 of the bleed plug 6 and through the opening 32 of the bleed bore 14.

By providing the passage 24 and the side port 26, as described above, the flow of the bled fluid may not pass through the threads of the threaded portion 22 (e.g., the fluid may not follow a thread bleed path 42) and may instead follow a passage bleed path 44, as shown in FIG. 2. The threaded portion 22 may therefore remain free from any contamination and/or degradation resulting from contact with the bled fluid. For example, if the fluid being bled was a coolant comprising water, by-passing the flow of water around threads may reduce corrosion of the threaded portion 22 of the bleed plug 6. Additionally, by providing the passage 24 and the side port 26, the bleed valve assembly 2 may be opened and closed by turning the bleed plug 6 through a smaller angle than if the fluid was bled through the threads of the bleed plug 6. The bleed plug 6 may also be retained more securely within the fastener 4, as all threads of the threaded portion 22 may remain engaged with the internal thread 16 of the bleed bore 14 whilst the fluid is being bled. Additionally, the flow of fluid from the bleed bore 14 does not vary with displacement of the shoulder 12 from a component through which the shank of the fastener has been passed (e.g., such as a surface of an engine as described below in the discussion of FIG. 3. The thread on the threaded portion 22 of the bleed plug may have a fine thread pitch value, for example the thread pitch may be equal to or less than 1 mm. This may allow opening of the bleed plug to be accurately controlled to allow gradual release of fluid. The thread on the shank 8 of the fastener 4 may have a different pitch, e.g. a smaller pitch, than the thread on the threaded portion 22 and the internal thread 16 of the fastener 4. This may prevent the fastener 4 from being unthreaded when the bleed plug is being turned to open the bleed valve assembly. Additionally or alternatively, the direction of the thread on the threaded portion 22 of the bleed plug may be different to the thread on the shank 8 of the fastener 4. For example, the thread on shank 8 may be a left handed thread and the thread on the threaded portion 22 of the bleed plug may be a right handed thread or vice versa.

As shown in FIG. 2, when the bleed plug 6 is in the open position, the radial protrusion 34 may still be at least partially received within the bleed bore 14. The presence of the radial protrusion 34 may reduce the flow area between the shank 20 and the bleed bore 14 of the fastener, which may reduce the flow rate of fluid through the bleed valve assembly. Reducing the initial flow rate may reduce the potential for injury resulting from an unexpectedly high initial flow rate, for example if the fluid being bled was at a high temperature. If the bleed valve assembly 2 was opened further, for example by unthreading the bleed plug 6 further from the internal bore 14 of the fastener 4, the restriction of the flow area may be reduced, e.g. the flow area may increase. This may lead to a greater flow rate of the fluid through the bleed valve assembly 2. By providing the radial protrusion 34, the ability to modulate the flow rate of fluid from the bleed bore 14 may be increased.

When the bleed plug 6 is in a closed position, as shown in FIG. 1, the radial protrusion 34 may be located such that at least a portion of the radial protrusion 34 is provided further within the bleed bore 14 than the abutment surface 40. This may allow the initial flow rate to be maintained at a constant level until the bleed plug 6 is in a sufficiently open position. Once the radial protrusion 34 is substantially longitudinally aligned with the abutment surface 40, the rate of change of flow rate may be determined by the taper of the abutment surface 40 and/or the side wall of the radial protrusion 34.

Figure 4:
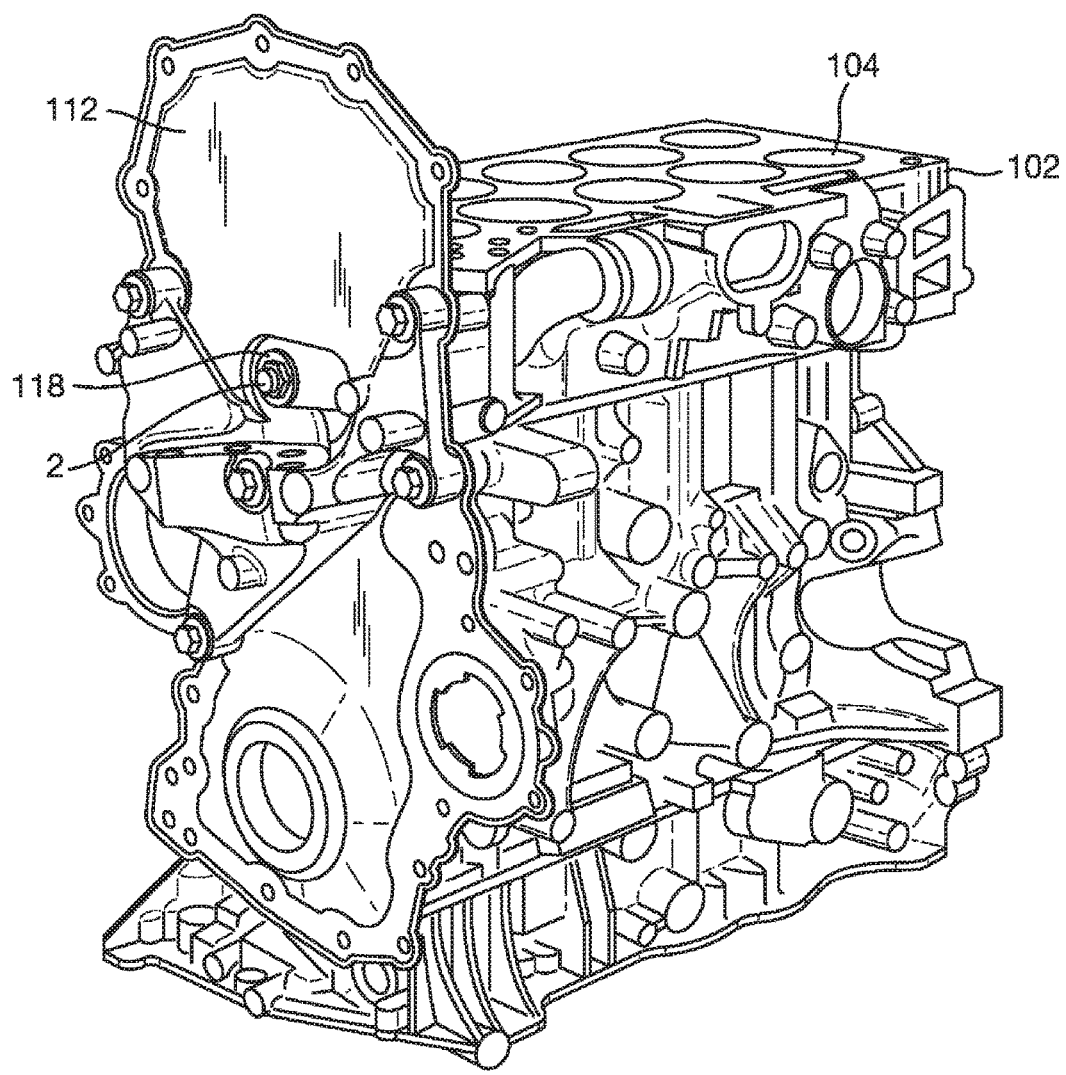
FIG. 4 is an isometric view of the engine assembly including the bleed valve assembly.

With reference to FIGS. 3-4, an engine assembly 100 of a vehicle, according to an example of the present disclosure, is described. As depicted in FIGS. 3-4, the engine assembly 100 may comprise a cylinder head 102, a cover 112 and the bleed valve assembly 2 (e.g., bleed valve assembly 2 shown by FIGS. 1-2).

An oil chamber 110 (e.g., an oil cavity) may be provided on one side of the cylinder head 102. The oil chamber 110 may contain oil used to lubricate the engine of the vehicle. The cover 112 may be coupled to the cylinder head 102 and may seal the oil chamber 110 via a gasket 114. The cover 112 and oil chamber 110 may be provided at an end face of the engine.

The cylinder head 102 may comprise a plurality of valve ports 102a which may allow intake and exhaust, of inlet air and exhaust gases respectively, to and from the engine cylinders (not shown). Combustion within the engine cylinders may heat the cylinder head 102. A coolant chamber 104 may be provided within the cylinder head 102 and may form part of a cooling system. The coolant chamber 104 may allow coolant to be circulated within the cylinder head 102. Heat may be transferred from the cylinder head 102 to the coolant, thereby cooling the cylinder head 102. The coolant may be circulated away from the cylinder head 102 by the cooling system to a radiator (not shown) provided on the vehicle. Air from outside the vehicle may be directed to flow over the radiator, allowing heat to be dissipated from the cooling system.

Engine coolant may be regularly replaced as part of routine service and maintenance of the vehicle. During this process, air may be introduced into the cooling system. Additionally, any leaks in the coolant system may allow air to enter the system. Any air within the cooling system may be circulated within the system and may reach the coolant chamber 104. Air present within the cooling system or the coolant chamber 104 may reduce the efficiency with which heat is removed from the cylinder head 102. For example, the air may form a bubble or pocket which prevents areas of the cylinder head from contacting the coolant. The air may have a lower thermal conductivity than the coolant and hence any areas of the cylinder head, which contact an area of the coolant chamber in which there is an air pocket, may be cooled less effectively than areas where the adjacent portion of the coolant chamber contains coolant. Additionally, the air may have a lower heat capacity than the coolant and hence circulation of air within the cooling system may reduce the overall rate of heat transfer between the cylinder head and the radiator. The efficiency of the cooling system may therefore be reduced. Air trapped within the coolant system may expand during operation of the engine and may cause degradation of the engine cylinder head and/or the cooling system.

In order to remove any unwanted air from the cooling system, the bleed valve assembly 2, as described above, may be provided within the engine assembly 100. A boss 106 may be provided on the cylinder head 102. The boss 106 may be unitary with the cylinder head 102 or may comprise a separate component, which may be coupled to the cylinder head. The boss 106 may comprise a bore 108 into which the fastener 4 of the bleed valve assembly 2 may be threaded. The bore 108 may be in fluidic communication with the coolant chamber 104 and hence air and/or coolant may be bled from the coolant chamber 104 via the bleed valve assembly 2, as described above.

In the example shown in FIGS. 3-4, packaging of the engine within the vehicle may be restricted and the possible locations in which the boss 106 may be provided may be limited. The position of the boss 106 may also be limited to locations in which the bleed valve assembly 2 may be accessible during service and maintenance, to allow coolant to be bled.

Any air present within the cooling system may collect at the highest point of the system. Hence, it may be desirable to provide the boss 106 such that the bore 108 may be in fluidic communication with the coolant chamber 104 at or near its highest point.

As depicted in FIG. 3, the boss 106 may be provided within the oil chamber 110. Such a position may be convenient for packaging reasons, as well as to provide access to the bleed valve assembly 2 for service and maintenance. The boss 106 may extend from the cylinder head 102 and may contact the cover 112. The fastener 4 of the bleed valve assembly 2 may pass through an opening in the cover 112 and may be threaded into the bore 108 of the boss 106. The shoulder 12 of the fastener 4 may contact the cover 112 and may apply a clamping force which couples the fastener 4 to the cover 112, coupling (e.g., clamping) the cover 112 against the boss 106. The clamping force provided by the fastener 4 may increase the seal of the cover 112 at the gasket 114. In addition, a seal may be formed between the bore 108 and the oil chamber 110 by virtue of the contact between the boss 106 and the cover 112. Additional sealing means 116, such as a gasket or o-ring, may be provided between the boss 106 and the cover 112.

In this way, by providing the bleed valve assembly 2, coolant may be bled from the coolant chamber 104 across the oil cavity 110. During bleeding of the coolant, the seals at the gasket 114 and between the boss 106 and the cover 112 may be maintained, as the coolant may be bled without removing or loosening the fastener 4. The boss 106 may therefore be provided in a convenient location, and allow the coolant to be bled, without impacting the sealing of the oil chamber. Maintaining sealing of the oil chamber whilst bleeding coolant from the coolant chamber may reduce the risk of cross-contamination between the oil and coolant systems. In additional to the above, the clamping provided by the fastener 4 and the positioning of the boss 106 may allow a noise, vibration and/or harshness (NVH) reducing characteristic of the cover 112 to be increased. The boss may also provide a further thermal interface for heat from the oil to transfer to the coolant. A washer 118 may be provided between the fastener 4 and the cover 112 to spread the clamping load from the shoulder 12 of the fastener and prevent damage to the cover 112 during installation of the fastener 4.

It will be appreciated by those skilled in the art that although the disclosure has been described by way of example, with reference to one or more examples, it is not limited to the disclosed examples and that alternative examples could be constructed without departing from the scope of the disclosure as defined by the appended claims.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one embodiment, a bleed valve assembly for an engine includes a fastener comprising: a threaded shank received within a bore of the engine, the bore in fluidic communication with a fluid chamber of the engine, a shoulder formed between the shank and a head of the fastener, the fastener providing a clamping force, and a bleed bore comprising an internal thread; and a bleed plug comprising a threaded portion received within the bleed bore of the fastener, the bleed plug comprising: an engaging portion at a proximal end of the bleed plug configured to selectively engage the fastener; a passage extending from a distal end of the bleed plug; and a side port in fluidic communication with the passage, the side port provided between the threaded portion and the engaging portion; wherein when the bleed plug is in an open position in which the engaging portion does not engage the fastener, fluid from the fluid chamber may be bled by the bleed plug with the fluid passing through the passage and side port and by-passing the threaded portion of the bleed plug; and wherein the bleed bore of the fastener comprises a chamfered edge at an opening of the bleed bore, wherein the engaging portion abuts the chamfered edge. In a first example of the bleed valve assembly, the engaging portion of the bleed plug comprises an abutment surface configured to selectively engage the fastener. A second example of the bleed valve assembly optionally includes the first example and further includes wherein the engaging portion comprises a seal configured to selectively engage the fastener to increase the sealing between the bleed plug and the fastener. A third example of the bleed valve assembly optionally includes one or more or both of the first and second examples, and further includes wherein the bleed plug further comprises a radial protrusion provided between the engaging portion and the side port, the radial protrusion restricting a flow area for the fluid being bled by the bleed plug during initial opening of the bleed plug. A fourth example of the bleed valve assembly optionally includes one or more or each of the first through third examples, and further includes wherein the radial protrusion retains the seal on the bleed plug. A fifth example of the bleed valve assembly optionally includes one or more or each of the first through fourth examples, and further includes wherein the radial protrusion and/or the bleed bore increases the flow area for the fluid being bled as the bleed plug is opened further. A sixth example of the bleed valve assembly optionally includes one or more or each of the first through fifth examples, and further includes wherein the pitch of the thread provided on the bleed bore of the fastener is different to the pitch of the thread on the shank of the fastener. A seventh example of the bleed valve assembly optionally includes one or more or each of the first through sixth examples, and further includes wherein the pitch of the thread provided on the bleed bore of the fastener is smaller than the pitch of the thread on the shank of the fastener. An eighth example of the bleed valve assembly optionally includes one or more or each of the first through seventh examples, and further includes wherein the bleed bore of the fastener is concentric with the threaded shank of the fastener. A ninth example of the bleed valve assembly optionally includes one or more or each of the first through eighth examples, and further includes wherein the fastener couples a cover to the engine.

In one embodiment, an engine assembly includes an engine cylinder head; a cover sealing an oil cavity of the engine; a bleed valve assembly; a boss comprising a bore on the engine cylinder head and extending across the oil cavity to the cover, the bore in fluidic communication with a coolant chamber; a fastener coupling the cover to the boss; and a bleed plug allowing fluid to bleed from the coolant chamber across the oil cavity. In a first example of the engine assembly, the fastener is received within the bore of the boss, the bleed plug is coupled to the fastener, and the bleed plug is removable from the fastener without removal of the fastener from the bore of the boss. A second example of the engine assembly optionally includes the first example and further includes wherein the fastener and bore are arranged at a vibrational anti-node of the cover.

In one embodiment of an engine bleed valve assembly, the engine bleed valve assembly includes a fastener received within an engine bore, the fastener including a fastener shoulder formed between a fastener shank and a fastener head, a threaded bore, and a chamfered edge at an opening of the threaded bore; and a threaded plug received within the threaded bore of the fastener, the threaded plug including a threaded plug shank, a passage internal to the threaded shank, a plug port in fluidic communication with the passage, and a plug shoulder formed between the threaded plug shank and a plug head. In a first example of the engine bleed valve assembly, the fastener shoulder is in face-sharing contact with an engine surface, and fluid flows from the threaded bore through the threaded plug when the plug shoulder is displaced from the threaded bore, and fluid flowing from the threaded bore does not vary with displacement of the fastener shoulder from the engine surface. A second example of the engine bleed valve assembly optionally includes the first example and further includes wherein the plug shoulder is in face-sharing contact with a plug seal. A third example of the engine bleed valve assembly optionally includes one or more or both of the first and second examples, and further includes wherein the threaded plug shank includes one or more circumferential ribs. A fourth example of the engine bleed valve assembly optionally includes one or more or each of the first through third examples, and further includes wherein the plug seal is arranged between the plug shoulder and the plug port. A fifth example of the engine bleed valve assembly optionally includes one or more or each of the first through fourth examples, and further includes wherein the threaded plug includes at least one additional plug port. A sixth example of the engine bleed valve assembly optionally includes one or more or each of the first through fifth examples, and further includes wherein the at least one additional plug port is in fluidic communication with the passage internal to the threaded shank.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A bleed valve assembly for an engine, the bleed valve assembly comprising:
   a fastener comprising:
      a threaded shank received within a bore of the engine, the bore in fluidic communication with a fluid chamber of the engine,
      a shoulder formed between the threaded shank and a head of the fastener, the fastener providing a clamping force, and
      a bleed bore comprising an internal thread; and a bleed plug comprising a threaded portion received within the bleed bore of the fastener, the bleed plug comprising:
    an engaging portion at a proximal end of the bleed plug configured to selectively engage the fastener;
    a passage extending from a distal end of the bleed plug; and
    a side port in fluidic communication with the passage, the side port provided between the threaded portion and the engaging portion;
    wherein, when the bleed plug is in an open position in which the engaging portion does not engage the fastener, fluid from the fluid chamber may be bled by the bleed plug with the fluid passing through the passage and side port and bypassing the threaded portion of the bleed plug; and
    wherein the bleed bore of the fastener comprises a chamfered edge at an opening of the bleed bore, wherein the engaging portion abuts the chamfered edge.

2. The bleed valve assembly according to claim 1, wherein the engaging portion of the bleed plug comprises an abutment surface configured to selectively engage the fastener.

3. The bleed valve assembly of claim 1, wherein the engaging portion comprises a seal configured to selectively engage the fastener to increase the sealing between the bleed plug and the fastener.

4. The bleed valve assembly of claim 1, wherein the bleed plug further comprises a radial protrusion provided between the engaging portion and the side port, the radial protrusion restricting a flow area for the fluid being bled by the bleed plug during initial opening of the bleed plug.

5. The bleed valve assembly of claim 4, wherein the radial protrusion retains a seal on the bleed plug.

6. The bleed valve assembly of claim 4, wherein the radial protrusion and/or the bleed bore increases the flow area for the fluid being bled as the bleed plug is opened further.

7. The bleed valve assembly of claim 1, wherein a pitch of threads in the internal thread provided on the bleed bore of the fastener is different to a pitch of threads on the threaded shank of the fastener.

8. The bleed valve assembly of claim 7, wherein the pitch of threads in the internal thread provided on the bleed bore of the fastener is smaller than the pitch of threads on the threaded shank of the fastener.

9. The bleed valve assembly of claim 1, wherein the bleed bore of the fastener is concentric with the threaded shank of the fastener.

10. The bleed valve assembly of claim 1, wherein the fastener couples a cover to the engine.

11. An engine assembly in an engine, comprising:
an engine cylinder head;
a cover sealing an oil cavity of the engine;
a bleed valve assembly;
a boss comprising a bore on the engine cylinder head and extending across the oil cavity to the cover, the bore in fluidic communication with a coolant chamber;
a fastener coupling the cover to the boss; and
a bleed plug allowing fluid to bleed from the coolant chamber across the oil cavity, the bleed plug including:
    an engaging portion at a proximal end of the bleed plug configured to selectively engage the fastener;
    a passage extending from a distal end of the bleed plug; and
    a side port in fluidic communication with the passage, the side port provided between a threaded portion and the engaging portion.

12. The engine assembly of claim 11, wherein the fastener is received within the bore of the boss, the bleed plug is coupled to the fastener, and the bleed plug is removable from the fastener without removal of the fastener from the bore of the boss.

13. The engine assembly of claim 12, wherein the fastener and bore are arranged at a vibrational anti-node of the cover.

14. An engine bleed valve assembly comprising:
a fastener received within an engine bore, the fastener including a fastener shoulder formed between a fastener shank and a fastener head, a threaded bore, and a chamfered edge at an opening of the threaded bore; and
a threaded bleed plug received within the threaded bore of the fastener, the threaded bleed plug including a threaded plug shank, a passage internal to the threaded plug shank, a plug port in fluidic communication with the passage and positioned between the threaded plug shank and an engaging portion, and a plug shoulder formed between the threaded plug shank and a plug head.

15. The engine bleed valve assembly of claim 14, wherein the fastener shoulder is in face-sharing contact with an engine surface, and wherein fluid flows from the threaded bore through the threaded bleed plug when the plug shoulder is displaced from the threaded bore, and wherein fluid flowing from the threaded bore does not vary with displacement of the fastener shoulder from the engine surface.

16. The engine bleed valve assembly of claim 14, wherein the plug shoulder is in face-sharing contact with a plug seal.

17. The engine bleed valve assembly of claim 16, wherein the threaded plug shank includes one or more circumferential ribs.

18. The engine bleed valve assembly of claim 16, wherein the plug seal is arranged between the plug shoulder and the plug port.

19. The engine bleed valve assembly of claim 14, wherein the threaded bleed plug includes at least one additional plug port.

20. The engine bleed valve assembly of claim 19, wherein the at least one additional plug port is in fluidic communication with the passage internal to the threaded plug shank.

* * * * *